US005524492A

United States Patent [19]
Frick et al.

[11] Patent Number: 5,524,492
[45] Date of Patent: Jun. 11, 1996

[54] PRESSURE TRANSMITTER ISOLATION DIAPHRAGM

[75] Inventors: Roger L. Frick, Hackensack; Robert K. Snyder, Andover, both of Minn.

[73] Assignee: Rosemount Inc., Eden Prairie, Minn.

[21] Appl. No.: 538,382

[22] Filed: Oct. 3, 1995

Related U.S. Application Data

[63] Continuation of Ser. No. 126,363, Sep. 24, 1993, abandoned.

[51] Int. Cl.$^6$ ................................................. G01L 7/00
[52] U.S. Cl. ............................................................. 73/706
[58] Field of Search .............................. 73/706, 716, 719, 73/720, 723, 725, 727, 728; 338/2, 3, 4, 5, 42

[56] References Cited

U.S. PATENT DOCUMENTS

| | | | |
|---|---|---|---|
| D. 317,266 | 6/1991 | Broden et al. | D10/46 |
| 3,405,559 | 11/1966 | Moffatt | 73/398 |
| 4,196,632 | 4/1980 | Sikorra | 73/718 |
| 4,208,782 | 6/1980 | Kurtz et al. | 29/580 |
| 4,236,137 | 11/1980 | Kurtz et al. | 338/4 |
| 4,276,533 | 6/1981 | Tominaga et al. | 338/4 |
| 4,301,492 | 11/1981 | Paquin et al. | 73/724 |
| 4,443,293 | 4/1984 | Mallon et al. | 156/647 |
| 4,479,070 | 10/1984 | Frische et al. | 310/338 |
| 4,586,108 | 4/1986 | Frick | 361/283 |
| 4,603,371 | 7/1986 | Frick | 361/283 |
| 4,625,559 | 12/1986 | Carter et al. | 73/706 |
| 4,790,192 | 12/1988 | Knecht et al. | 73/721 |
| 4,798,089 | 1/1989 | Frick et al. | 73/706 |
| 4,800,758 | 1/1989 | Knecht et al. | 73/727 |
| 4,833,922 | 5/1989 | Frick et al. | 73/756 |
| 4,993,754 | 2/1991 | Templin, Jr. | 285/189 |
| 5,005,421 | 4/1991 | Hegner et al. | 73/72 |
| 5,022,270 | 6/1991 | Rud, Jr. | 73/706 |
| 5,024,098 | 6/1991 | Petitjean et al. | 73/729 |
| 5,081,867 | 1/1992 | Yamada | 73/517 R |
| 5,094,109 | 3/1992 | Dean et al. | 73/718 |
| 5,095,755 | 3/1992 | Peterson | 74/706 |
| 5,157,972 | 10/1992 | Broden et al. | 73/718 |
| 5,178,015 | 1/1993 | Loeppert et al. | 73/718 |
| 5,201,228 | 4/1993 | Kojima et al. | 73/724 |
| 5,214,961 | 6/1993 | Kojima et al. | 73/715 |
| 5,227,068 | 1/1994 | Fukiura et al. | 73/724 |
| 5,349,492 | 9/1994 | Kimura et al. | 361/283.4 |
| 5,381,300 | 1/1995 | Thomas et al. | 361/280 |
| 5,424,650 | 6/1995 | Frick | 324/688 |

FOREIGN PATENT DOCUMENTS

| | | |
|---|---|---|
| 0086737A1 | 8/1983 | European Pat. Off. . |
| 0521246A2 | 1/1993 | European Pat. Off. . |
| 3839515A1 | 6/1989 | Germany . |
| 4244450A1 | 12/1992 | Germany . |
| 705124 | 3/1954 | United Kingdom . |
| WO93/2264 | 5/1993 | WIPO . |

OTHER PUBLICATIONS

"Creep of Sensor's Elastic Elements: Metals versus Non-metals." K. Bethe, D. Baumgarten and J. Frank, *NOVA SENSOR—Silicon Sensors and Microstructure*, Jun. 1990, pp. 844–849.
"Advanced Sensor Designs," Chapter 5, *NOVA SENSOR—Silicon Sensors and Microstructure*, pp. 5.4–5.8.
"Signal Conditioning for Sensors." Chapter 8, *NOVA SENSOR—Silicon Sensors and Microstructure*, pp. 8.21–8.23.
"Packaging Technology," Chapter 9, *NOVA SENSOR—Silicon Sensors and Microstructure*, pp. 9.9–9.15.
"Sapphire Transducer Works Under Pressure," *Machine Deesign*, vol. 59, No. 3, Feb. 12, 1987, p. 72.

*Primary Examiner*—Richard Chilcot
*Assistant Examiner*—William L. Oen
*Attorney, Agent, or Firm*—Westman, Champlin & Kelly

[57] ABSTRACT

A transmitter provides an output indicative of pressure of process fluid. The transmitter has a first body with a passageway filled with isolation fluid extending from a first port to a pressure sensor. A second body has an inlet for receiving process fluid and a second port. An isolation diaphragm between the first and second ports isolates process fluid from isolation fluid. A seal adjacent the diaphragm seals the diaphragm and couples the diaphragm to the second body. A spring urges the seal against the diaphragm.

23 Claims, 2 Drawing Sheets

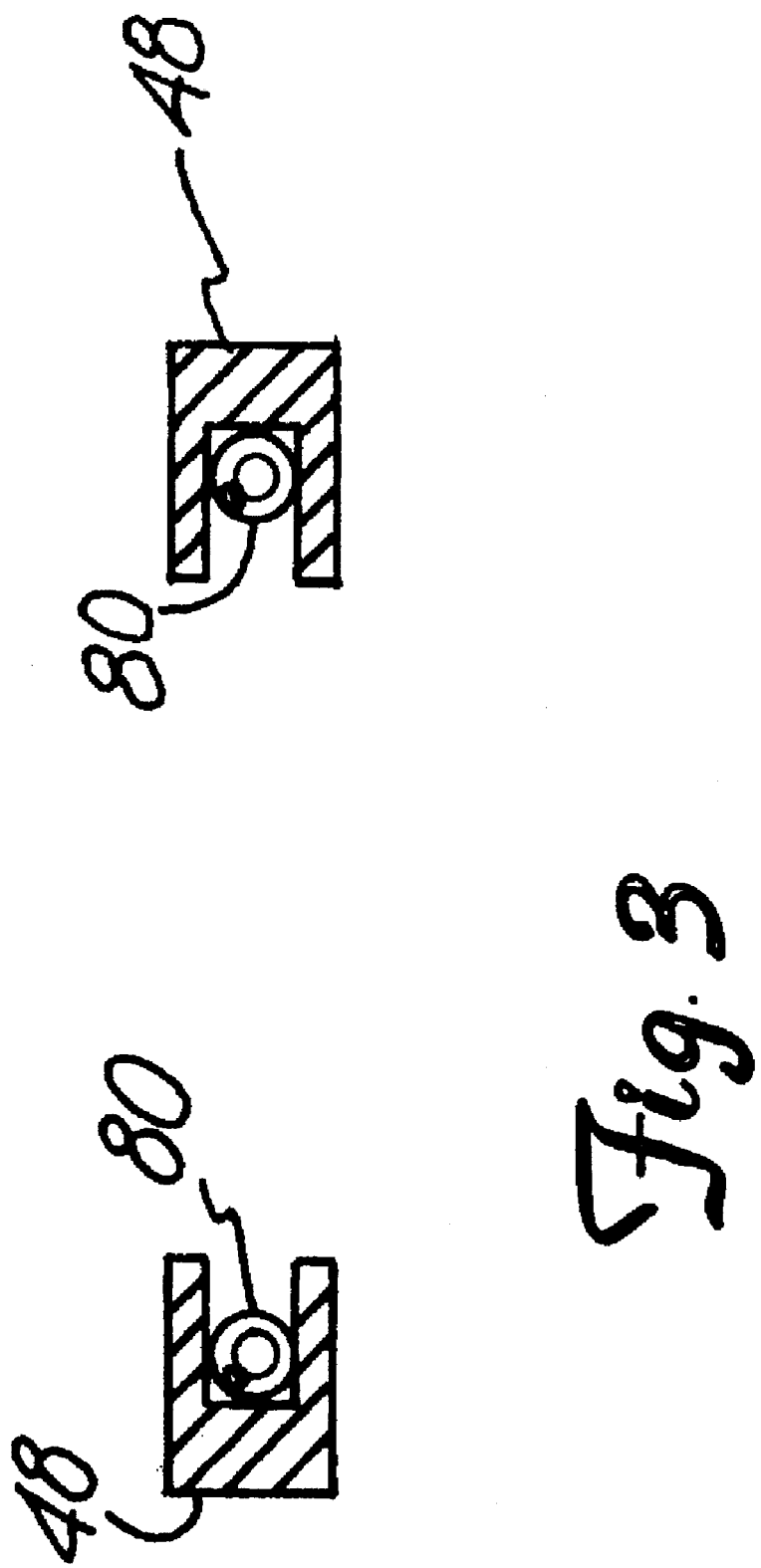

PRESSURE TRANSMITTER ISOLATION DIAPHRAGM

This is a File Wrapper Continuation of application Ser. No. 08/126,363, filed Sep. 24, 1993 now abandoned. Priority of the prior application is claimed pursuant to 35 USC § 120.

BACKGROUND OF THE INVENTION

The present invention relates to a pressure transmitter. In particular, it relates to an isolation diaphragm in a pressure transmitter.

Pressure transmitters have a pressure sensor coupled to an isolation diaphragm. The isolation diaphragm isolates the pressure sensor from corrosive process fluids being sensed. Pressure is transferred from the isolation diaphragm to the sensor through a substantially incompressible isolation fluid carried in a passageway. U.S. Pat. No. 4,833,922 entitled MODULAR PRESSURE TRANSMITTER and U.S. Pat. No. 5,094,109 entitled PRESSURE TRANSMITTER WITH STRESS ISOLATION DEPRESSION show pressure transmitters of this type.

Since the isolation diaphragm is exposed to process fluid, it is subjected to corrosive materials which may damage its structure. Sapphire and ceramic materials are well suited for isolation diaphragms because of their ruggedness and corrosion resistance. However, stresses applied to seal a diaphragm made of these materials tend to change the diaphragm's stiffness or shape and cause errors. Furthermore, diaphragms made of these materials have not been able to displace a sufficient quantity of fluid to obtain accurate pressure measurements. A practical seal that is not susceptible to corrosion has not been available.

SUMMARY OF THE INVENTION

The present invention is a transmitter for providing an output indicative of pressure of process fluid. The transmitter includes a first passageway filled with isolation fluid extending from a first port to a sensing means, and a second passageway for receiving process fluid and having a second port. An isolation diaphragm separates the first port from the second port and isolates process fluid from isolation fluid. A seal adjacent the diaphragm couples the diaphragm to the process fluid pressure. The seal is held by a substantially planar spring that is not susceptible to corrosion. Furthermore, a diaphragm assembly carrying the diaphragm is mounted in a stress isolation mount.

BRIEF DESCRIPTION OF THE DRAWINGS

FIG. 3 is a cross-sectional view of a seal.

DETAILED DESCRIPTION OF THE PREFERRED EMBODIMENTS

Figure 1:
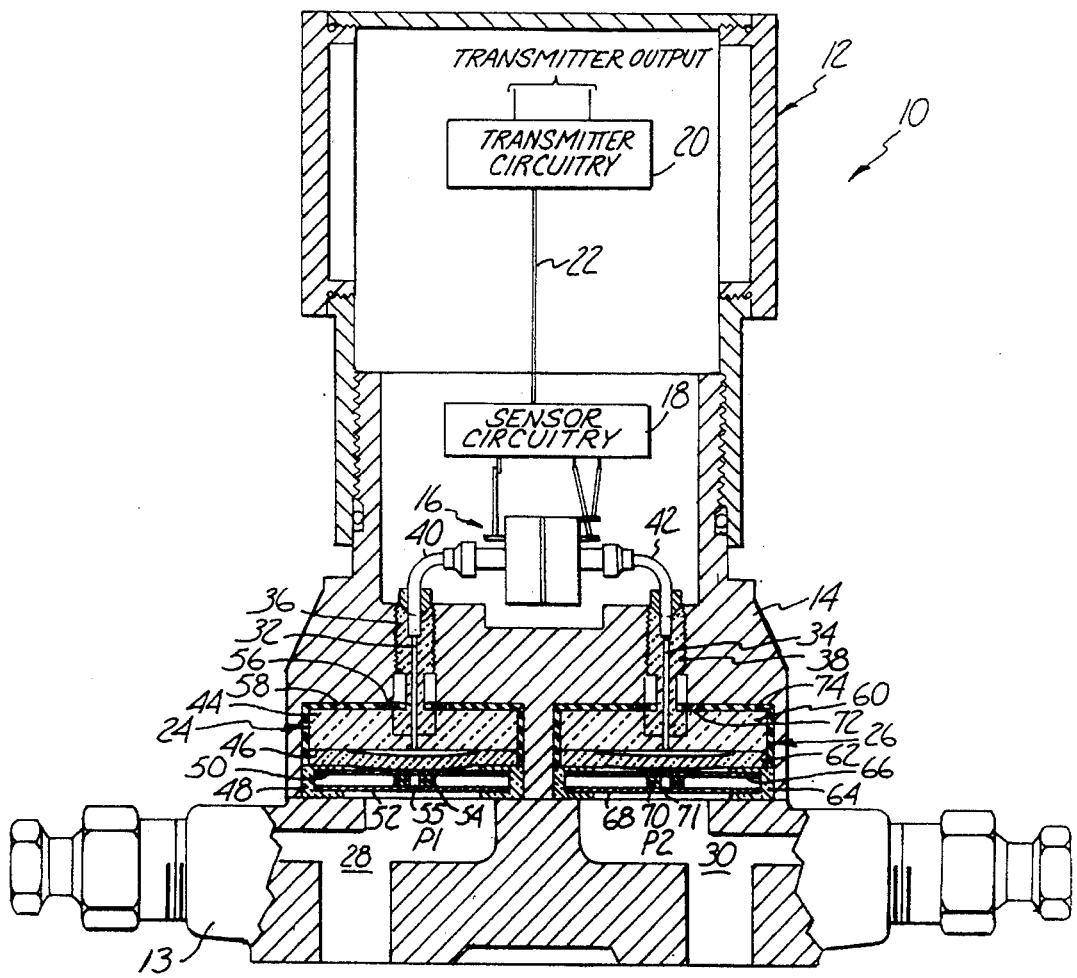
FIG. 1 is a cross-sectional fragmentary view of a pressure transmitter in accordance with the present invention.

FIG. 1 shows pressure transmitter 10 having transmitter body 12, flange 13 and sensor body 14 in accordance with the present invention. Sensor body 14 includes pressure sensor 16, and transmitter body 12 includes transmitter circuitry 20. Sensor circuitry 18 is coupled to transmitter circuitry 20 through communication bus 22. Transmitter circuitry 20 sends information related to pressure of process fluid over a two wire communication circuit.

Sensor body 14 includes isolator assemblies 24 and 26, in accordance with the present invention. Assembly 24 is shown in greater detail in FIG. 2. Pressure sensor 16 measures a difference in pressure between pressure P1 in passageway 28 and pressure P2 in passageway 30 of flange 13. Pressure P1 is coupled to sensor 16 through passageway 32 via isolator assembly 24. Pressure P2 is coupled to sensor 16 through passageway 34 via isolator assembly 26. Passageway 32 extends through coupling 36 and tube 40. Passageway 34 extends through coupling 38 and tube 42. Passageways 32 and 34 are filled with a relatively incompressible fluid such as oil. Couplings 36 and 38 are threaded into sensor body 14 and provide a long flame-quenching path between the interior of sensor body carrying sensor circuitry 18 and process fluid contained in passageways 28 and 30.

Figure 2:
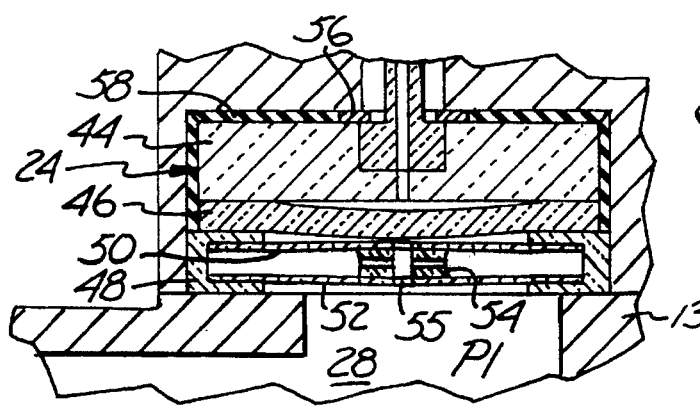
FIG. 2 is a cross-sectional view of an isolation diaphragm shown in FIG. 1.

Isolator assembly 24 includes seat 44 preferably fusion bonded to isolation diaphragm 46. This is shown in FIG. 2 in greater detail. Seat 44 and diaphragm 46 are sapphire in one embodiment and ceramic in another embodiment. Passageway 32 extends through seat 44 to diaphragm 46. Polytetrafluoroethylene (PTFE) seal 48 lies between diaphragm 46 and flange 13. Ceramic springs 50 and 52 are positioned in PTFE seal 58 and spaced apart by shim 54. Shim 54 includes a horizontal passage to allow fluid communication with both sides of springs 50 and 52. Passageway 55 extends between passageway 28 and ceramic diaphragm 46. Seat 44 is separated from sensor body 14 by washer 56 and silicone rubber 58.

Isolator assembly 26 includes seat 60 preferably fusion bonded to isolation diaphragm 62. PTFE seal 64 separates diaphragm 62 from flange 13. Ceramic springs 66 and 68 are contained within PTFE seal 64 and separated by shim 70, which is typically ceramic. Passageway 71 extends through shim 70 and ceramic springs 66 and 68 thereby providing fluid communication between diaphragm 62 and passageway 30. Washer 72 and silicone rubber 74 separate seat 60 from sensor body 14.

It is desirable to use a ceramic or sapphire diaphragm because it will not react with process fluid. Furthermore, brittle materials such as these tend to have reduced hysteresis providing improved accuracy. However, a major problem with such a design is to provide adequate stress isolation so that bolting and sealing stresses do not change the stiffness or shape of the diaphragm and cause errors. The invention addresses these problems by minimizing sealing stresses by using a spring-loaded PTFE seal which minimizes contact sealing forces on the isolation diaphragm and by providing stress isolation from the bolting forces necessary to contain line pressures of up to 6000 psi. For optimum corrosion resistance, the invention uses a corrosion resistant spring.

A brittle isolator will have a larger thickness to diameter ratio and a higher modulus than a typical prior art metal diaphragm. This causes the brittle diaphragm to be stiffer than a metal one. One solution is to provide a corrugated diaphragm. However, this is not possible for a brittle diaphragm using current technology. A brittle isolator requires stress isolation not taught in the prior art.

Isolation assemblies 24 and 26 are stress isolated from sensor module 14 through silicone rubber seals 58 and 74. This reduces stress on assemblies 24 and 26 because the only solid connection to module 14 is around couplings 36 and 38 and washers 56 and 72. Further, assemblies 24 and 26 are isolated from flange 13 by seals 48 and 50. In one embodiment, these seals are of PTFE because of its sealing properties and corrosion resistance.

PTFE is capable of "cold flow." Over time, PTFE tends to change its shape in response to applied pressure. One solution is to provide a coiled metal spring in PTFE seals 48 and 64 of corrosive resistant metal. FIG. 3 is a cross-sectional view of seal 48 using a coil spring 80. Alternatively, the spring can be of a ceramic material with better corrosion resistance. The spring should provide sufficient deflection to accommodate tolerances in the parts and should make up for any creep in the PTFE that occurs with time.

The present invention provides a technique for providing a spring to a seal produced from a material which is resilient and corrosion resistant, such as PTFE. Ceramic springs 50 and 52 urge PTFE seal 48 to maintain its shape. (Although diaphragm assembly 24 is discussed herein, the same discussion applies for diaphragm assembly 26.) Passageway 55 through springs 52 and 50 and shim 54 allows process fluid to actuate diaphragm 46 and transfer pressure P1 from passageway 28 to passageway 32 for measurement by pressure sensor 16 and sensor circuitry 18. Ceramic springs 50 and 52 provide sufficient deflection to accommodate tolerances in the parts to be sealed and to make up for any creep in the PTFE that occurs with time. The springs also apply sufficient force to cause the PTFE to flow into irregularities in the surfaces to be sealed.

The amount of energy that can be stored by a spring is given by the formula:

$$E_{spring} \propto \frac{\sigma_{max}^2}{E} V$$

where $E_{spring}$ is the energy stored in the spring, $\sigma_{max}$ is the maximum working stress of the material, E is the modulus of elasticity and V is the volume of the material. Ceramic and other brittle materials tend to have a lower $\sigma_{max}$ and a higher E than metals. This causes $\sigma_{max}/E$ to be from 10 to 50 times lower for brittle materials than for metal materials. To compensate for this, the present invention uses a spring with a volume between 10 and 50 times large than a corresponding metal spring. The invention achieves this by extending the spring beyond the edges of the PTFE seal. In addition to problems with their energy storage capacity, it is also difficult to form miniature coils from ceramic and other brittle materials. Multiple ceramic springs can be stacked to provide any desired spring constant. Holes in the spring allow process fluid to pass to the isolating diaphragm. If a ceramic material is used to form diaphragms 46 and 62, process fluid does not contact any corrodible materials in isolator assemblies 24 and 26.

A brittle isolator assembly tends to be stiff. Any change in stiffness causes an error in pressure measurement. To minimize changes in stiffness, the invention surrounds the isolator assembly with process fluid pressure. This is accomplished by using an elastomeric support (rubber) which will develop a hydrostatic force about equal to the process fluid pressure. The elastomeric support should be thin enough so that it will not extrude or expand excessively with temperature changes. This may exceed the capacity of the spring.

The invention also employs fusion bonding rather than braze material to bond the diaphragm. The fusion bond is not susceptible to corrosion or creep.

The diaphragms of the present invention are preferably used in pressure sensors that require little displacement of the isolation fluid and have a low volume to minimize the total expansion of the fluid to obtain a pressure measurement. A sensor that provides reduced isolation fluid displacement is described in the patent application entitled SUSPENDED DIAPHRAGM PRESSURE SENSOR Ser. No. 08/123,729, filed Sep. 20, 1993 by Roger L. Frick which is hereby incorporated by reference.

Although the present invention has been described with reference to preferred embodiments, workers skilled in the art will recognize that changes may be made in form and detail without departing from the spirit and scope of the invention. For example, other materials can be used for the springs such as sapphire.

What is claimed is:

1. A transmitter for providing an output indicative of a pressure of a process fluid comprising:

a transmitter body;

transmitter circuitry in the transmitter body for providing the output;

a sensor body coupled to the transmitter body;

sensor circuitry in the sensor body connected to the transmitter circuitry;

a pressure sensor coupled to the sensor circuitry providing an output related to an applied pressure;

a passageway filled with isolation fluid having a first end coupled to the pressure sensor and a second end;

a brittle corrosion resistant isolation diaphragm in the sensor body proximate the second end of the passageway;

stress isolation material between the sensor body and the isolation diaphragm supporting the isolation diaphragm and maintaining the isolation diaphragm substantially at the pressure of the process fluid;

a seal adjacent the isolation diaphragm on a side opposite the second end of the passageway; and a flange coupled to the sensor body and having a flange passageway for coupling the process fluid to the isolation diaphragm whereby the pressure of the process fluid is provided to the pressure sensor through the isolation of fluids.

2. The transmitter of claim 1 including:

a second passageway filled with isolation fluid having a first end coupled to the pressure sensor and a second end;

a second brittle corrosion resistant isolation diaphragm in the sensor body proximate the second end of the passageway;

a second seal adjacent the second isolation diaphragm on a side opposite the second end of the passageway; and wherein a second pressure is coupled to the pressure sensor.

3. The transmitter of claim 2 wherein the diaphragms are substantially co-planar.

4. The transmitter of claim 1 wherein the seal comprises PTFE.

5. The transmitter of claim 1 including a spring adjacent the seal comprising ceramic.

6. The transmitter of claim 1 including a spring adjacent the seal comprising sapphire.

7. The transmitter of claim 1 including a second spring adjacent a first spring and the seal and functioning in cooperation with the first spring.

8. The transmitter of claim 7 including a shim between the first and second springs.

9. The transmitter of claim 1 wherein the isolation material maintains the isolation diaphragm assembly in substantial stress isolation from the sensor body.

10. The transmitter of claim 1 including a coil spring adjacent the seal.

11. The transmitter of claim 1 wherein the isolation diaphragm comprises ceramic.

12. The transmitter of claim 1 wherein the isolation diaphragm comprises sapphire.

13. A transmitter for providing an output indicative of a pressure of a process fluid, comprising:

a body having a first passageway filled with isolation fluid extending from a first port to a sensing means for providing a pressure related output and a cavity carrying process fluid;

an isolator assembly coupled to the first passageway for preventing process fluid from entering the first passageway, the isolator assembly including a brittle corrosion resistant diaphragm disposed on the first face for coupling to process fluid;

a seal for sealing the diaphragm and coupling the process fluid pressure to the diaphragm; and a resilient stress isolating mount separating the second face of the isolator assembly from the body and coupling the isolator assembly to the body, the stress isolating mount maintaining the isolator assembly substantially at the pressure of the process fluid.

14. The transmitter of claim 13 including a first elongated spring adjacent the seal for urging the seal against the diaphragm.

15. The transmitter of claim 14 wherein the spring comprises ceramic.

16. The transmitter of claim 14 wherein the spring comprises sapphire.

17. The transmitter of claim 15 including a second elongated spring adjacent the first spring and functioning in cooperation with the first spring.

18. The transmitter of claim 17 including a shim between the first and second springs.

19. The transmitter of claim 13 wherein the resilient stress isolating mount comprises an elastomeric layer between the diaphragm assembly and the body.

20. The transmitter of claim 13 wherein the diaphragm comprises a ceramic isolation diaphragm.

21. The transmitter of claim 13 wherein the diaphragm comprises a sapphire isolation diaphragm.

22. The transmitter of claim 13 wherein the body includes a second passageway and the transmitter includes a second isolator assembly having a second diaphragm coupled to the second passageway for coupling a second pressure of process fluid to the transmitter, 23. The transmitter of claim 22 wherein the diaphragms are substantially co-planar.

* * * * *